June 23, 1931.  K. L. HANSEN  1,811,669
ARC WELDING APPARATUS
Filed Aug. 9, 1928
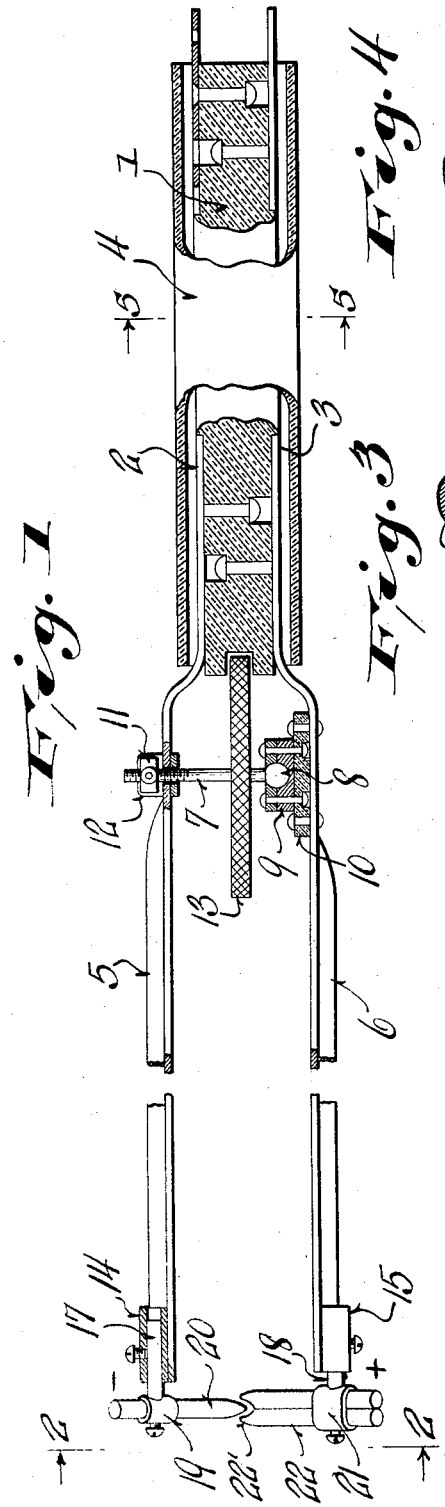
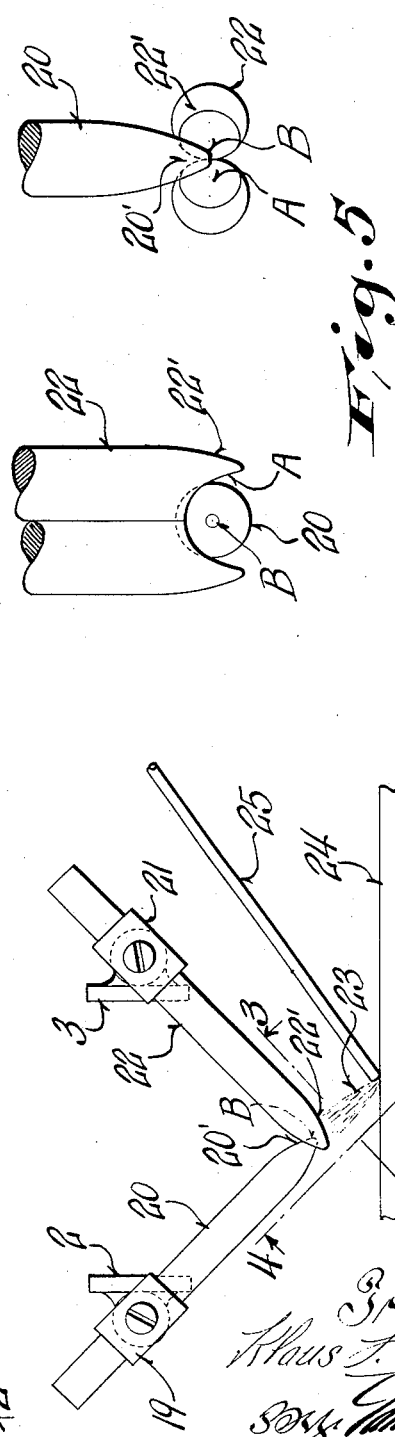

Patented June 23, 1931

1,811,669

UNITED STATES PATENT OFFICE

KLAUS L. HANSEN, OF MILWAUKEE, WISCONSIN

ARC WELDING APPARATUS

Application filed August 9, 1928. Serial No. 298,494.

This invention relates to an arc welding apparatus.

In the early days of arc welding, attempts were made to use the flame of an arc struck between two carbons, for welding or similar purposes. These attempts, however, were unsatisfactory, as it was impossible to get the arc against the work in an effective manner and to properly control the arc with respect to the work, so as to direct the arc flame to the spot on which it was desired to deposit metal.

These attempts were soon given up in favor of what was later known as the carbon arc and metallic arc welding processes, in which the work constituted a part of the electric circuit either as the positive or negative pole of the arc itself. There is a great heat concentration when work is made one pole of the arc itself. This is satisfactory where intense heat is desired, but where welding is performed on metals that are alloys of other elements, such for example, as brass, which is composed of copper and zinc, these metals having different melting points, the metal of the lower melting point usually fuses completely out and volatilizes and goes off before the joint can be made.

When the work is part of the electric circuit, it is probable that an electrolytic action takes place and aids in the separation of the metals from the alloy in addition to the separation due to heat, although this is not definitely known at this time.

Further, the intense localized heat made it practically impossible to weld metals or alloys where the work formed one pole of the arc and also is wholly unsatisfactory for soldering, brazing, etc. Also, there is no positive and easy regulation of the heat by drawing the arc out under this process. If the current in the circuit is reduced, the total heat is reduced, but the heat at any local point is still intense.

This invention overcomes the defects noted above, and provides a novel arc welding device and method of welding in which the heat of the arc at the work may be very readily controlled in such a simple manner as merely moving the arc towards or from the work, and with which soldering, brazing and other operations of this type may be most easily performed, as well as work upon metals or alloys of metals for different melting points without danger of driving any of the metals off at the joint.

Further objects are to provide a novel form of arc welding device and a method of welding in which there is no appreciable oxidation of the surface of the work, and in which the physical characteristics of the joint are very much improved.

Further objects are to provide an extremely simple, easily controlled arc welding device, which may be easily and cheaply produced, and in which the wearing away of the carbons is substantially uniform both for the positive and negative electrodes.

An embodiment of the invention is shown in the accompanying drawings in which:

Figure 1 is a plan view of the device with parts broken away and in section;

Figure 2 is an end view of the device approximately on the line 2—2 of Figure 1, such view being drawn to an enlarged scale and showing merely the carbons and the immediately associated parts;

Figure 3 is a view taken on the line 3—3 of Figure 2;

Figure 4 is a view taken on the line 4—4 of Figure 2;

Figure 5 is a transverse sectional view on the line 5—5 of Figure 1.

Referring to the drawings, it will be seen that the device comprises a handle which consists of a block 1 of insulating material to which is riveted or otherwise secured, a pair of arms 2 and 3. This block is carried within a shell 4 which may be of metal or any other suitable material, and which contacts with the block 1. It is to be noted, however, that the shell 4 of the handle is spaced from the arms 2 and 3. These arms 2 and 3 extend outwardly from the handle and are provided with reenforced projecting portions which form movable arms 5 and 6, respectively.

These movable arms are provided adjacent the handle with means for varying their separation or relative postions. For example, a screw stem 7 may be provided with a ball head 8 received within the composite block 9 carried by the arm 6 and insulated therefrom by means of the strip 10 of insulating material. The other end of the screw stem passes through a swively mounted nut 11 carried between prongs 12 secured to the arm 5. Preferably, the handle is notched out to accommodate the knurled adjusting hand wheel 13 which is rigidly mounted upon the threaded stem 7.

The arms 5 and 6 may, as stated, be reenforced in any suitable manner, as for example, by means of the web or T-shape shown in Figure 1. The outer ends of the arms 5 and 6 carry sleeves 14 and 15 which adjustably receive the pins 17 and 18, such pins being locked in adjusted position, by set screws or any other suitable means. The pin 17 carries an electrode receiving sleeve or handle 19 which carries the negative electrode 20. The pin 18 carries the sleeve 21 which is larger than the sleeve 19 and preferably of oval shape and receives the double positive electrode 22. This positive electrode is shown as formed of two distinct carbons. Obviously, these carbons could be formed integral with each other so long as they provided a double body, which has been found to be the preferable construction.

The pointed end 20' of the negative electrode 20 is located between the cut out pointed ends 22' of the positive electrode. This is most clearly brought out in Figures 1, 3, and 4. Also, it is to be noted particularly from Figure 2, that the electrodes are arranged at an angle to each other, less than 180° and preferably greater than 90°, as this has been found most satisfactory in actual practice and it is to be distinctly understood that the exact angular relation of the electrodes may be varied.

It has been found from actual tests conducted with this device that the arc struck between the negative electrode and the positive electrode is blown outwardly laterally of, and past the positive electrode so as to form a tongue of flame, as indicated by the reference character 23, as shown in Figure 2. It has been found that this arc eats away the positive electrode and forms the cup-shaped cutout or end A, shown in Figures 3 and 4, at the pointed ends 22' of such positive electrode.

Further, it has been found that the negative electrode is formed by the arc in a pointed shape, as indicated by the reference character B in Figure 4. Futher than this, wearing away of the electrode is substantially uniform and a very slight adjustment of the carbon is required only, after an appreciable length of time.

Although the actual principles controlling the operation of this apparatus are not fully understood at this time, it is believed that the negative electrode exerts a repulsive action upon the arc and blows the arc laterally past the positive electrode.

When it is considered that the arc is composed of a large number of negative charged bodies, such for instance, as electrons, it is appreciated that the field created by the negative electrode would have this effect. However, this theory of operation is advanced merely to aid in an understanding of the invention and is not intended to be construed as limiting in any sense.

In using the apparatus, the arc is readily struck by a slight adjustment of the knurled hand wheel 13 and thereafter the carbons are separated to the desired amount. The arc, as stated, and as indicated in Figure 2, is projected outwardly past the positive electrode. This arc may be played upon the work 24 and the welding rod 25 may be held in one hand of the operator and slid along the work as the arc is moved. The arc may be as freely used as any torch flame and it has been found that the degree of heat or degree of localized head can be most easily controlled by moving the arc towards or from the work. Further, from actual tests conducted with this apparatus, it has been found that the work is not injured by the arc, but that this arc leaves the work in substantially the same physical condition as that which it initially had.

There is substantially no oxidation produced by this arc and, therefore, the amount of scaling and defective joints resulting from the use of this arc are substantially zero with regard to the usual practice.

It will be seen that a very simple and wholly novel method of arc welding has been disclosed by this invention and one which may be most easily controlled, and used for a great variety of purposes.

It has been found, for instance, that this arc may be used not only for welding in the usual sense, but also for brazing, soldering, or other operations of this type.

It is to be distinctly understood that the term "welding" appearing in the claims is to be interpreted broadly and not in a limited sense, as it is intended that the term shall cover all of the usual operations enumerated, in joining or operating upon metals.

Although the invention has been described in considerable detail, such description is intended as illustrative rather than limiting as the invention may be variously embodied and as the scope of such invention is to be determined as claimed.

I claim:

1. An arc welding apparatus comprising a pair of electrodes between which the arc is formed, the positive electrode having two enlarged approximately parallel portions and the negative electrode having its end located between the enlarged portions of the positive electrode, the negative electrode being arranged at an angle to the axis of the positive electrode.

2. An arc welding apparatus comprising a negative electrode, a positive electrode, said positive electrode having a cut out end partly surrounding the end of said negative electrode and having ears located on opposite sides of said negative electrode, and means for feeding said electrodes to maintain the cut out end and ears on said positive electrode.

3. An arc welding apparatus comprising a negative electrode, a positive electrode, said negative electrode having a smaller lateral dimension than said positive electrode, said positive electrode having ears between which the end of said negative electrode is located, and means for feeding said electrodes to maintain said ears and the relative position of said electrodes as they wear away.

In testimony that I claim the foregoing I have hereunto set my hand at Milwaukee, in the county of Milwaukee and State of Wisconsin.

KLAUS L. HANSEN.